United States Patent [19]

Zhadanovsky

[11] Patent Number: 5,772,935
[45] Date of Patent: Jun. 30, 1998

[54] METHOD OF CONTINUOUS EXTRACTION OF PLASTICIZER FROM BATTERY SEPARATOR MEMBRANES AND THE LIKE DURING THEIR MANUFACTURE, AND EXTRACTOR APPARATUS THEREFOR

[76] Inventor: Igor Zhadanovsky, 27 Herrick Rd., #3, Newton, Mass. 02159

[21] Appl. No.: 696,506

[22] Filed: Aug. 14, 1996

[51] Int. Cl.$^6$ .................................................. B01D 67/00
[52] U.S. Cl. .............................. 264/48; 264/49; 264/233; 264/344; 210/500.27
[58] Field of Search .................................. 264/41, 48, 49, 264/233, 344; 210/634, 511, 500.27

[56] References Cited

U.S. PATENT DOCUMENTS

| | | | |
|---|---|---|---|
| 3,013,924 | 12/1961 | Taft | 264/48 |
| 3,351,495 | 11/1967 | Larsen | 136/146 |
| 3,412,184 | 11/1968 | Sharples | 264/49 |
| 3,536,797 | 10/1970 | Cowan | 264/48 |
| 4,772,440 | 9/1988 | Kasi | 264/41 |
| 4,929,380 | 5/1990 | Schulz | 252/221 |
| 4,990,255 | 2/1991 | Blume | 264/48 |
| 5,032,331 | 7/1991 | Onishi | 264/48 |
| 5,041,225 | 8/1991 | Norman | 264/48 |
| 5,186,835 | 2/1993 | Masuoka | 210/500.36 |
| 5,238,623 | 8/1993 | Meozinski | 264/48 |

*Primary Examiner*—Ernest G. Therkorn
*Attorney, Agent, or Firm*—Rines and Rines

[57] ABSTRACT

Plasticizer extraction from polymer membranes such as battery separators and the like, by exposure to a solvent-water combination. The water or steam is supplied to form an additional interface in a bulk solvent, and to agitate the solvent and control the temperature, as well. At the extractor exit, as well as the inlet, a water elbow is furnished in such a manner as to prevent solvent vapor contact with the atmosphere, and to keep the extractor body under some excessive pressure.

17 Claims, 5 Drawing Sheets

METHOD OF CONTINUOUS EXTRACTION OF PLASTICIZER FROM BATTERY SEPARATOR MEMBRANES AND THE LIKE DURING THEIR MANUFACTURE, AND EXTRACTOR APPARATUS THEREFOR

FIELD OF INVENTION

The invention relates to processes and apparatus for manufacturing polymer composite membranes, such as battery separators and the like, being more particularly directed to improvements in the extraction of plasticizer oils during the manufacture of such membranes.

BACKGROUND

A particular class of porous composite membranes is presently produced by an extrusion process in which the membrane composition mixture contains a polymer for providing support functions, silica as a reinforcer, and an oil as plasticizer, similar to motor oil, as described, for example, by Masaaki Kasi, "Method for Production of Porous Membrane", U. S. Pat. No. 4,929,380, November 86. The solvent extraction of the majority of the plasticizer produces the desired microporous structure, as well as providing the required flexibility and strength of the final product.

The solvent and extraction conditions are chosen so that the polymer is essentially insoluble. When petroleum oil plasticizer is to be extracted from the molded composition, the following solvents have been found to be suitable: chlorinated hydrocarbon solvents such as trichloroethylene, tetrachloroethylene, carbon tetrachloride, methylene chloride, tetrachloroethylene, etc.; and hydrocarbon solvents such as hexane, benzene, petroleum ether, toluene, cyclohexane, gasoline, etc., proposed by Donald Wain, "Battery Separator", U.S. Pat. No. 3,351,495, No. 1966. If, on the other hand, a polyethylene glycol is to be extracted, the extraction medium can be water, ethanol, methanol, acetone, etc. The extraction temperature can range anywhere from room temperature up to the melting point of the polyolefin so long as the polyolefin does not dissolve.

The time of the extraction depends upon the temperature used and the nature of the plasticizer to be extracted. When a higher temperature is employed, the extraction time for an oil can be only a few minutes; whereas, if the extraction is performed at room temperature, the time requirement for plasticizer extraction in a polymeric plasticizer can be in the order of several hours.

For prior art processes, however, the mineral oil extraction usually lasts minutes in a counter-flow apparatus, generally of the type shown in hereinafter described FIG. 1, wherein an unextracted membrane sheet is fed from large rolls into the extractor, counter to the solvent. The extractor is sectioned by internal walls to keep oil concentration gradients between sections. Elevated temperature usage for the extraction process is limited by solvent loss into the atmosphere. While closed systems, systems under low pressure and special solvent traps may be used to prevent solvent evaporation into the environment, these approaches are quite complicated and expensive.

OBJECTS OF INVENTION

It is an object of the present invention, accordingly, to provide a new and improved method of and apparatus for such plasticizer extraction in the manufacture of porous composite polymer membranes, such as those used as battery separators, and for similar usages, that address the before-described and other prior problems.

Other and further objects will be explained hereinafter and are more particularly delineated in the appended claims.

SUMMARY

In summary, however, from one of its important viewpoints, the invention embraces a method of continuous extraction of an oil plasticizer from a composite polymer membrane sheet, that comprises, conveying the membrane sheet between an extractor inlet and outlet and intermediately through and along successive sections of an extractor solvent in counter flow to fresh solvent, the solvent being of the type suitable for oil extraction, but insoluble in water; and injecting water/steam at the inlet and outlet and into the sections to provide inlet and outlet water compartments locking against solvent evaporation into the atmosphere and to provide intermediate water interfaces to the membrane as it passes between the successive extractor solvent sections.

Preferred and best mode procedures and extraction apparatus and conditions are later described in detail.

DRAWINGS

The invention will now be described in connection with the accompanying drawings, FIG. 1 of which, as earlier described, illustrates, in longitudinal cross-section, the passage of a membrane sheet from a sheet-extruder extruder through successive separated sections of a solvent bath in counter flow, for extracting the plasticizer oil from the membrane sheet;

THE INVENTION

Underlying the present invention is the discovery that appropriate addition of water or steam injection along the membrane surface during the extraction process can surprisingly alter the surface layer effects at appropriate temperatures, not only to accelerate the oil extraction from the membrane sheet, but to do so while preventing solvent loss into the environment and, where desired, to control temperature.

It had heretofore been known in surface interface chemistry, that in such and similar liquid-solid systems, dissolved materials accumulate at the surface in view of molecular charges and slow down diffusion into the bulk solvent. In other applications, surfactants may be used to remove this surface layer. Such, however, is not appropriate for battery separator membrane manufacturing because even traces of surfactant may deleteriously affect battery performance.

Figure 1:
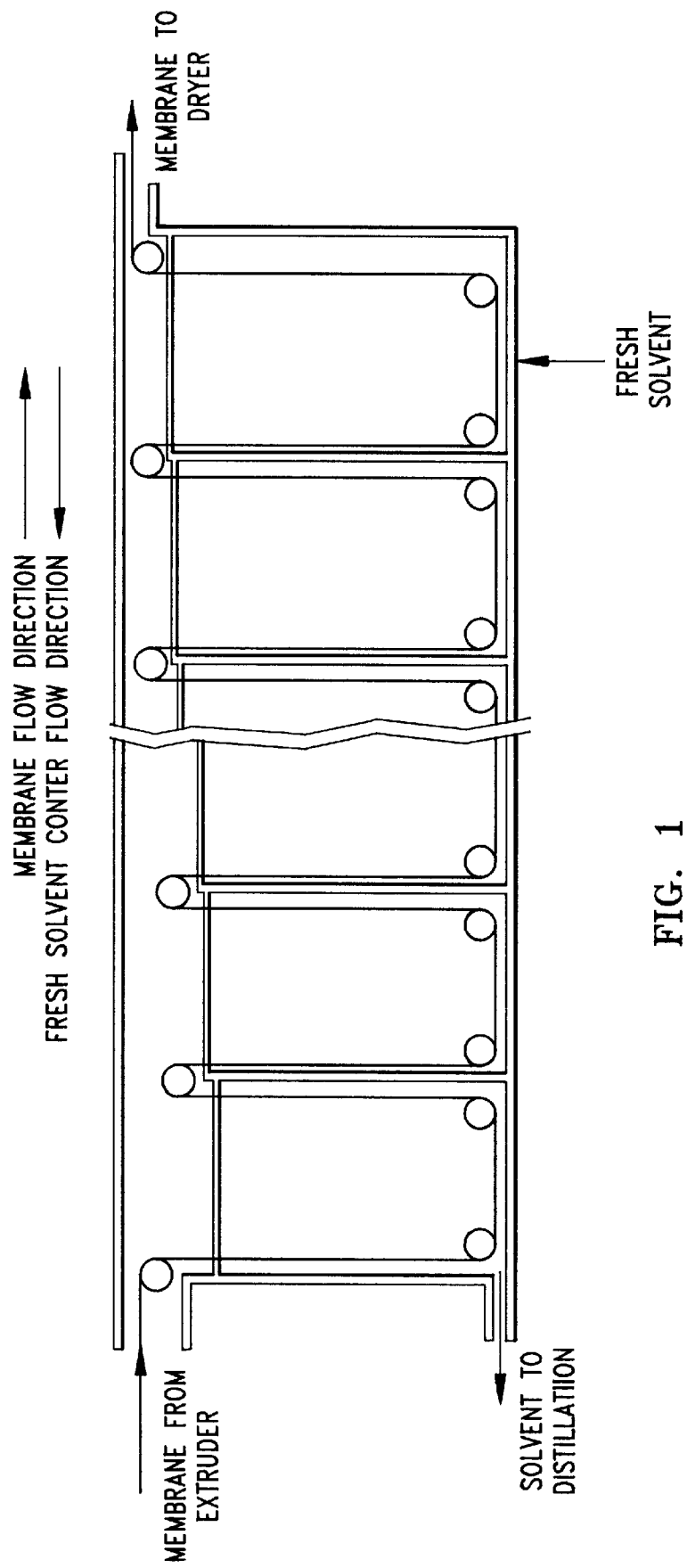
Figure 2:
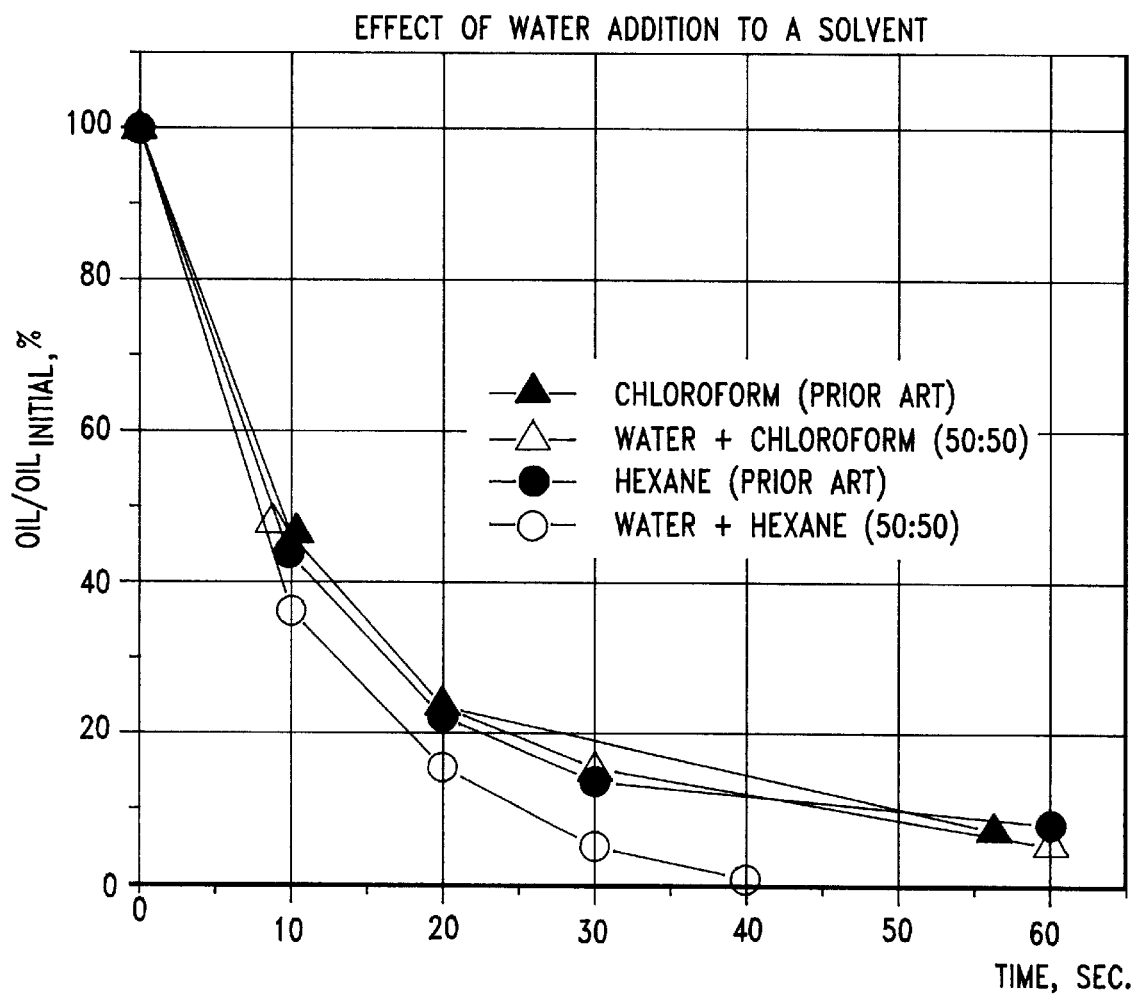
FIG. 2 is a graph of experimentally derived data, plotting extraction efficacy as a function of time, for prior art solvents and conditions as used in systems such as FIG. 1, and also for improved water-added interfaces in accordance with the present invention, as later more fully explained.

In the method of the present invention, on the other hand, the effect of the surface layer is attenuated by adding a second component—a water interface in a suitable form, proportion and location—and in which the solvent is insoluble and remains physically separate. The surface layer is forced from the membrane-solvent interface to a new membrane-water interface formed in the bulk solvent. In the graph of FIG. 2, (extraction versus time), it is demonstrated that the addition of the water layer does not degrade the extraction times of the pure solvent; in fact it may be somewhat improved. Pure hexane and pure chloroform and combinations of hexane-water (50:50) and chloroform-water (50:50) in accordance with the present invention, show very comparable results. Best extraction results at room temperature were achieved when the water interface was added to the hexane or chloroform with this ratio of about 50:50; results decreasing with ratios of 60:30 and 30:60, though wider ratio ranges can be used at more elevated temperatures.

The "bulk" interface is formed by the water injection into the extractor sections, preferably through microholes, and directed toward the membrane surface. Solvent mixing is synergistically accelerated at the same time. Steam injection into the solvent, furthermore, makes extremely small water droplets (tiny steam bubbles shrink 100 fold when condensed in the solvent), and therefore extensive "bulk" interface surfaces are developed by the dispersed droplets. The combination of the solvent with water or steam, furthermore, is a very effective way to maintain and regulate temperature in the extractor, as well.

Surprisingly, it turned out that acceleration of extraction can be produced by a species which does not dissolve oil at all. This is an indirect indication of the before-described surface layer existence, and such a subtlety is of a great value, because the invention enables prevention of solvent loss into the environment, as verified in the later-described experimental examples. The technology of the invention, indeed, prevents solvent loss into the atmosphere no matter how volatile the solvent may be, and it allows the extraction to be carried out at temperatures even up to solvent boiling temperatures. As previously noted, the solvent should be insoluble in water. Presently, low vapor pressure is an important factor in choosing the solvent—the lower the vapor pressure, the less solvent loss.

EXAMPLE 1

Figure 3:
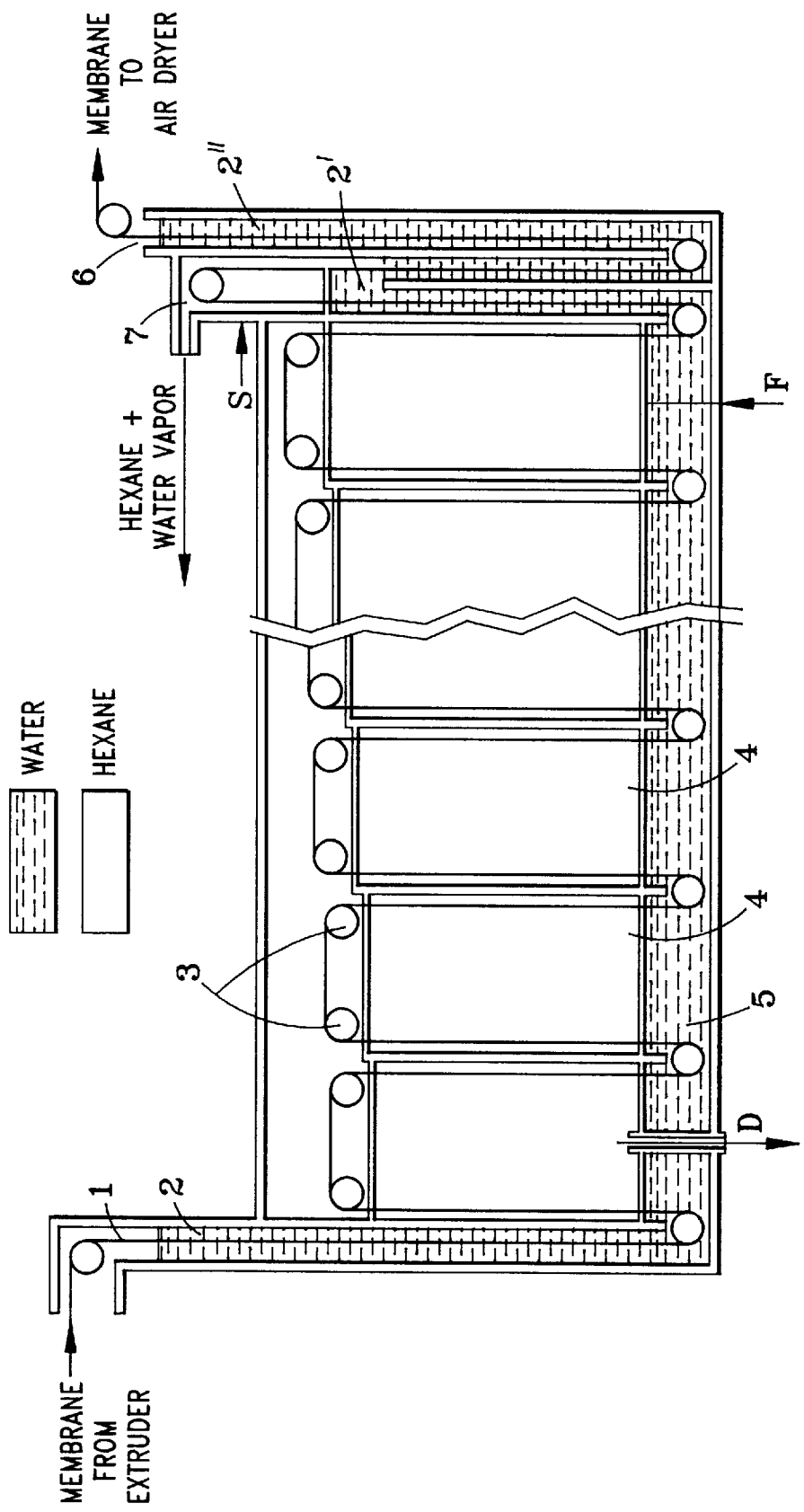
FIG. 3 is a view similar to FIG. 1, but of a process using the invention with hexane-water interfacing.

In FIG. 3, a new extractor design is shown for using the before-described water-hexane solvent combination of the invention (water density is higher and the water layer 5 is at the bottom). The membrane sheet 1 from the fabrication extruder is introduced into the extractor body through a water-filled inlet elbow or compartment 2 serving as a barrier to lock the hexane within the extractor. A similar locking elbow or compartment 2" is provided at the exit 6. Hot water (or steam) is injected toward the membrane surface as the membrane passes along rollers 3 upward and downward in the successive sections 4 of the solvent, in counter flow to fresh solvent introduced at F, and through successive sections 4 of the extractor, each preferably of successively decreasing height, from right-to-left, to provide hexane flow thereover.

When steam is injected, additional agitation is achieved; steam bubbles float up, condense into tiny droplets and then sink to the water layer 50 at the bottom. To prevent contaminated solvent carrying over into a less contaminated section, the membrane is conveyed over rollers 3 from section to section 4 and successively through the water layer 5, as it is shown in FIG. 3. Before the water-lock outlet elbow 2" at the extractor exit 6, the membrane is conveyed through a water-filled compartment or section 2' maintained at a temperature at or above 69° C. (the hexane boiling point), and a steam-vaporizing section 7 at which steam S is injected to prevent traces of the solvent from being carried away in pores of the membrane sheet. The extractor temperature determines the required elbow section height; the higher the temperature, the higher the vapor pressure above the solvent, and the higher the water column. Pressure release valves, well known but not shown in order not to complicate the drawings with obvious details, will connect the extractor and steam vaporizing sections to a distillation unit, schematically represented at D, to maintain pressure in the extractor.

The water injection into the hydrocarbon solvent also serves to increase, process safety. The extractor housing is naturally electrically grounded, so that all static electricity problems are eliminated.

The method of the invention, furthermore, can be applied for any other hydrocarbon solvent with corresponding correction for operating temperature based on boiling temperature of the chosen solvent.

EXAMPLE 2

Figure 4:
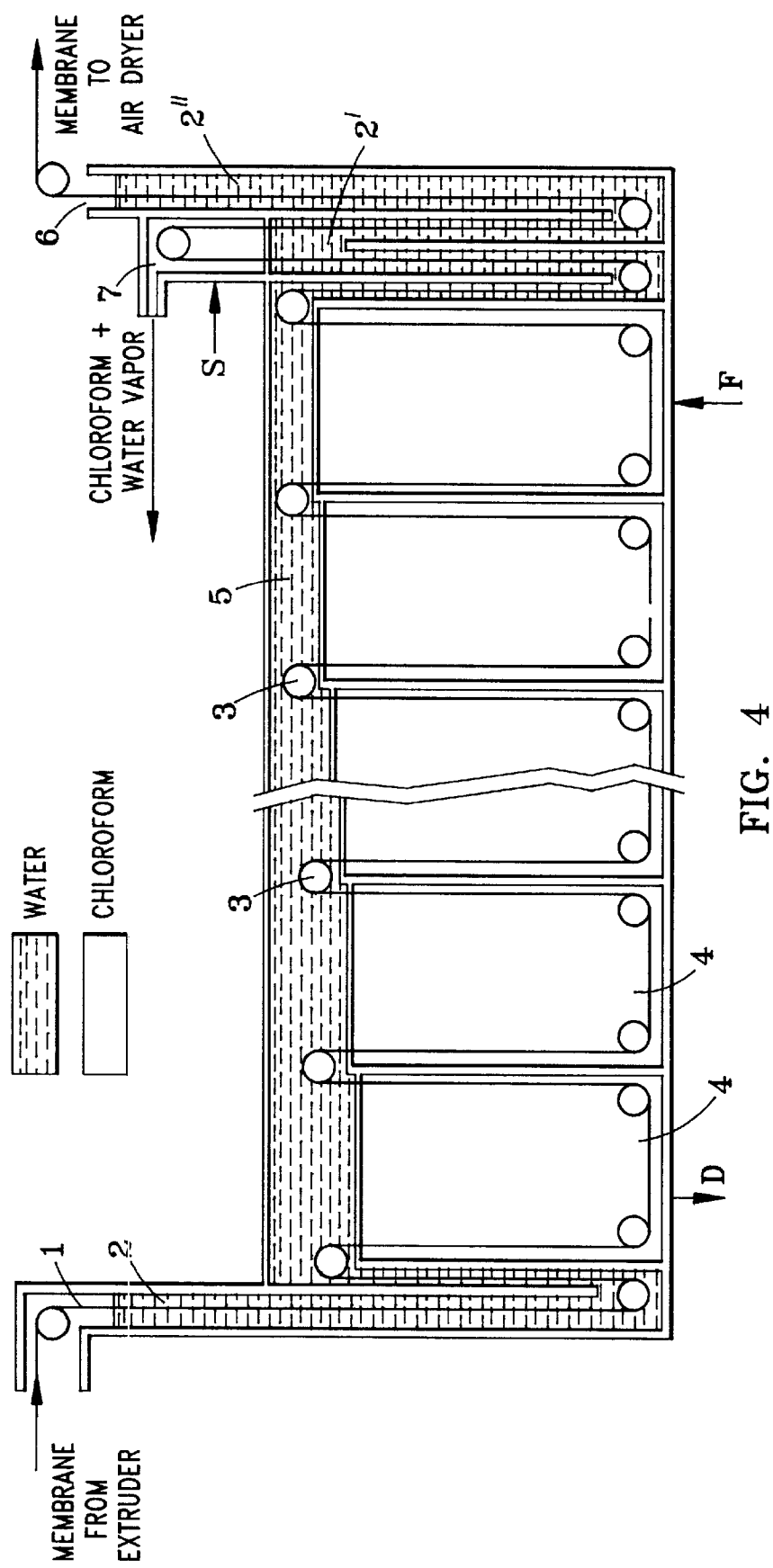
FIG. 4 is a view similar to FIG. 3, for a modified chloroform-water operation.

In FIG. 4, the novel extractor design of the invention is shown embodying a water-chloroform combination (water density is lower, and the water layer 5 is above the solvent). The membrane sheet 1 from the fabrication extruder is again introduced into the extractor body through a water-filled compartment elbow 2 in order to lock the chloroform within the extractor. The water-filled inlet elbow compartment 2 thus precedes the contact of the membrane with the extractor solvent sections and thus locks against solvent evaporation into the atmosphere. Hot water (or steam S) is injected toward the membrane surface as the membrane passes through successive extractor sections 4. Additional interfaces are therefore formed close to the membrane-chloroform interface, as before explained, and the plasticizer mineral oil redistribution is promoted. The inner extractor walls are again shown as decreasing in height, from right-to-left, to provide chloroform flow thereover. To prevent contaminated solvent carrying to less contaminated sections, the membrane 1 is conveyed at rolls 3 from section to section 4 through the water layer 5, provided this time above the chloroform, as shown. Before the extractor outlet exit 6, the membrane is conveyed through a water-filled compartment section 2' maintained at a temperature above 61.2° C. (the chloroform boiling point) and a steam vaporizing section 7 to prevent solvent from being carried away in membrane pores. As in the system of Example 1, the pressure in the extractor is determined by the solvent (chloroform) temperature and maintained by the water elbow and pressure release valve. At the exit outlet 6, the outlet water-filled elbow compartment 2", similar to the inlet elbow compartment 2, locks against solvent evaporation to the atmosphere. This serves, also, to keep the extractor body under some excessive pressure.

The method of the invention can also be applied for any other chlor-, iod-, brom- organic solvent with corresponding correction for operating temperature based on boiling temperature of chosen solvent.

It should be mentioned that light hydrocarbons are insoluble in water; but the solubility of chlorinated solvents is in the order of 0.1–0.2 g/100 ml $H_2O$; so precautions are taken with any recycling of the water when the chlorinated solvent is used.

EXAMPLE 3

Figure 5:
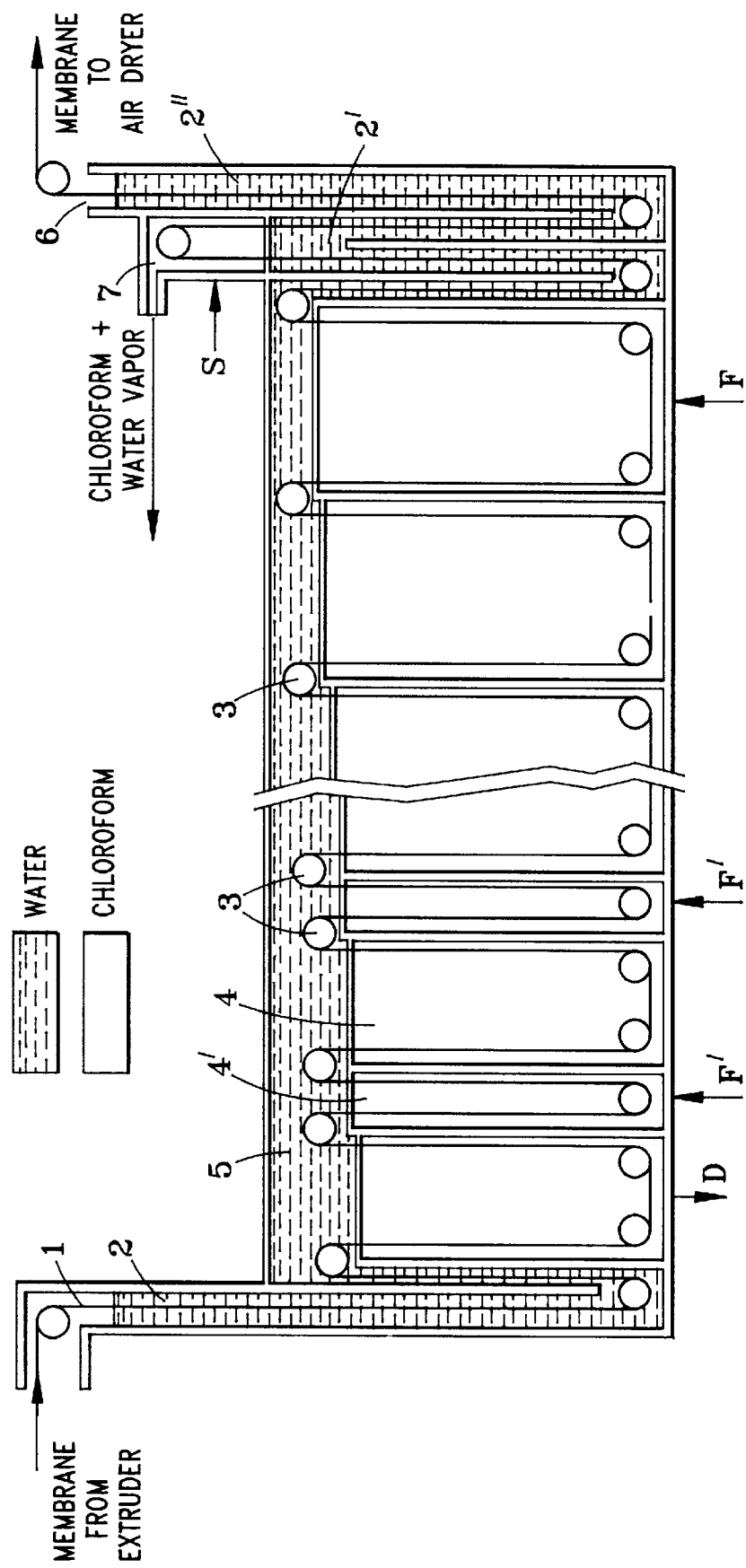
FIG. 5 is a variation of the type of operation of FIG. 4.

In FIG. 5, a modified extractor design is shown for the water-chloroform combination of Example 2. The difference is the addition of further extractor section 4', where quick membrane rinsing by a chloroform - water mixture takes place, stripping off the surface oil layer. Chloroform F' after distillation, or slightly contaminated chloroform from the later sections, should be used for rinsing. The same process results may be produced 1.2–1.3 times quicker. This rinsing approach also works for hydrocarbon solvents, with a corresponding rinsing section 4' added in the system of Example 1.

In all cases, in accordance with the technique of the invention, the oily plasticizer-filled polymer membrane sheet has its plasticizer continuously extracted during passage upward and downward through successive solvent-water baths, with the water or steam supplied as an injected interface in, over the top of, or under the bottom of and about, the bulk solvent. This simultaneously agitates the solvent and aids in temperature control, as well. At the exit, as previously described, a water elbow is provided to prevent solvent vapor contact with the atmosphere and to keep the extraction housing under some excessive water pressure.

From about 5 to about 70% weight of water or steam may be used for injection into the extractor sections for accelerating the extraction process and/or as an appropriate heating agent to maintain extraction process temperature. Where water-solvent rinsing is used (FIG. 5 and Example 3), moreover, the water-solvent rinse mixture may desirably have volume ratios of from about 1:20 to 4:6 after being exposed to the solvent in the first extractor section(s). The rinse mixture may be obtained from fresh solvent after distillation, or from slightly contaminated solvent from the last extractor section(s).

Further modifications will also occur to those skilled in this art and such are considered to fall within the spirit and scope of the invention as defined in the appended claims.

What is claimed is:

1. A method of continuous extraction of an oil plasticizer from a composite polymer membrane sheet, that comprises, conveying the membrane sheet between an extractor inlet and outlet and intermediately through and along successive sections of an extractor solvent in counter flow to fresh solvent injection, the solvent being of a type suitable for extraction oil, but insoluble in water; and injecting water/steam at the inlet and outlet and into the sections to provide inlet and outlet water compartments locking against solvent evaporation into the atmosphere and to provide intermediate water interfaces to the membrane as it passes between the successive extractor solvent sections.

2. A method as claimed in claim 1 and in which the water/steam provides temperature control for the extraction.

3. A method as claimed in claim 2 and in which the water temperature near the outlet is maintained at or higher than the solvent boiling temperature to prevent solvent carryout in membrane pores as the membrane exits the outlet.

4. A method as claimed in claim 1 and in which the membrane is rinsed by water-solvent mixture between successive solvent sections.

5. A method as claimed in claim 4 and in which the rinsing is effected after the membrane has been conveyed through first extractor solvent section(s).

6. A method as claimed in claim 5 and in which the weight ratios of the water-solvent rinse mixture is adjusted to be from about 1:20 to about 4:6.

7. A method as claimed in claim 5 and in which the water-solvent rinse is performed by fresh solvent after distillation or slightly contaminated solvent from the last extractor section(s).

8. A method as claimed in claim 1 and in which the oil solvent is selected from the group consisting of hydrocarbon, chlor-, brom- and iod-organic solvents.

9. A method as claimed in claim 8 and in which the hydrocarbon solvent is selected from the group consisting of hexane, benzene, petroleum ether, toluene, cyclohexane and gasoline.

10. A method as claimed in claim 8 and in which the chlorinated hydrocarbon is selected from the group consisting of trichloroethylene, tetrachloroethylene, carbon tetrachloride, methylene chloride, and tetrachloroethylene.

11. A method as claimed in claim 8 and in which the ratio of mixture of solvent and water is of the order of about 50:50.

12. A method of continuous extraction of an oil plasticizer from a composite polymer membrane sheet, that comprises, conveying the membrane sheet through successive sections of an extractor solvent, insoluble in water, in counter flow to fresh solvent injection, while injecting water/steam to provide water interfaces through which the membrane is conveyed as it passes between successive solvent sections.

13. A method as claimed in claim 12 and in which the injected water forms inlet and outlet barriers in the extractor through which the membrane initially and finally passes, to lock against the evaporation of solvent to the atmosphere.

14. A method as claimed in claim 13 and in which the water temperature near the outlet is maintained at or higher than the solvent boiling temperature to prevent solvent carryout by the membrane as it exits the outlet.

15. A method as claimed in claim 12 and in which the temperature of the extraction is controlled by the heating action of the water/steam.

16. A method as claimed in claim 12 and in which the membrane is rinsed by water-solvent mixture rinsing between one or more of the successive solvent sections.

17. A method as claimed in claim 12 and in which the injected water/steam forms layers along one of the top and bottom of the extractor sections.

* * * * *